United States Patent [19]

Jagoe et al.

[11] Patent Number: 5,426,876

[45] Date of Patent: Jun. 27, 1995

[54] CALENDAR PHOTO ALBUM

[76] Inventors: Brian T. Jagoe; Janette N. Jagoe, both of 878 Beryl St., San Diego, Calif. 92109

[21] Appl. No.: 133,845

[22] Filed: Oct. 12, 1993

[51] Int. Cl.6 .............................................. G09D 3/04
[52] U.S. Cl. ...................................... 40/119; 40/122; 40/107; 40/537; 40/594; 40/630
[58] Field of Search ................ 40/107, 119, 121, 122, 40/159, 537, 594, 630, 638

[56] References Cited

U.S. PATENT DOCUMENTS

| | | | |
|---|---|---|---|
| 1,371,269 | 3/1921 | Stevens | 40/119 |
| 2,526,575 | 10/1950 | Neal | 40/119 |
| 3,195,257 | 7/1965 | Weine | 40/159 |
| 3,687,770 | 8/1972 | Chase | 40/594 |
| 4,662,093 | 5/1987 | Suttles et al. | 40/594 |
| 4,896,027 | 1/1990 | Drexler | 40/159 |
| 5,016,917 | 5/1991 | Dubner et al. | 40/119 |
| 5,033,215 | 7/1991 | Newberry et al. | 40/122 |
| 5,292,154 | 3/1994 | Williams | 40/107 |

FOREIGN PATENT DOCUMENTS

| | | | |
|---|---|---|---|
| 0135044 | 11/1919 | United Kingdom | 40/159 |
| 2166109 | 4/1986 | United Kingdom | 40/638 |
| 0009017 | 8/1990 | WIPO | 40/630 |

Primary Examiner—Edward K. Look
Assistant Examiner—Christopher Verdier
Attorney, Agent, or Firm—Page Lohr

[57] ABSTRACT

Calendar Photo Album having a pad of assembled sheets suitably mounted to turn as leaves and presenting pairs of opposed pages, one of the pages of each pair bearing a calendar page of a different month of the year, and the other page of each pair bearing a picture holding member for displaying photos and the like. This arrangement provides the opportunity to include and interchange multiple snapshots, photographs, or other graphic work at one time. Pictures and the like can be inserted in all of the calendar pages and may easily be interchanged with other photos at any time without disassembly of the Calendar Photo Album. Each picture holding member holds pictures and the like by one of the following attachment methods: 1) Adhesive material for attachment and interchanging of varying-sizes of photos, 2) Diagonal slits for inserting and interchanging varying sizes of photos, 3) A window frame cut-out with plastic sleeves for receiving and interchanging photos.

4 Claims, 6 Drawing Sheets

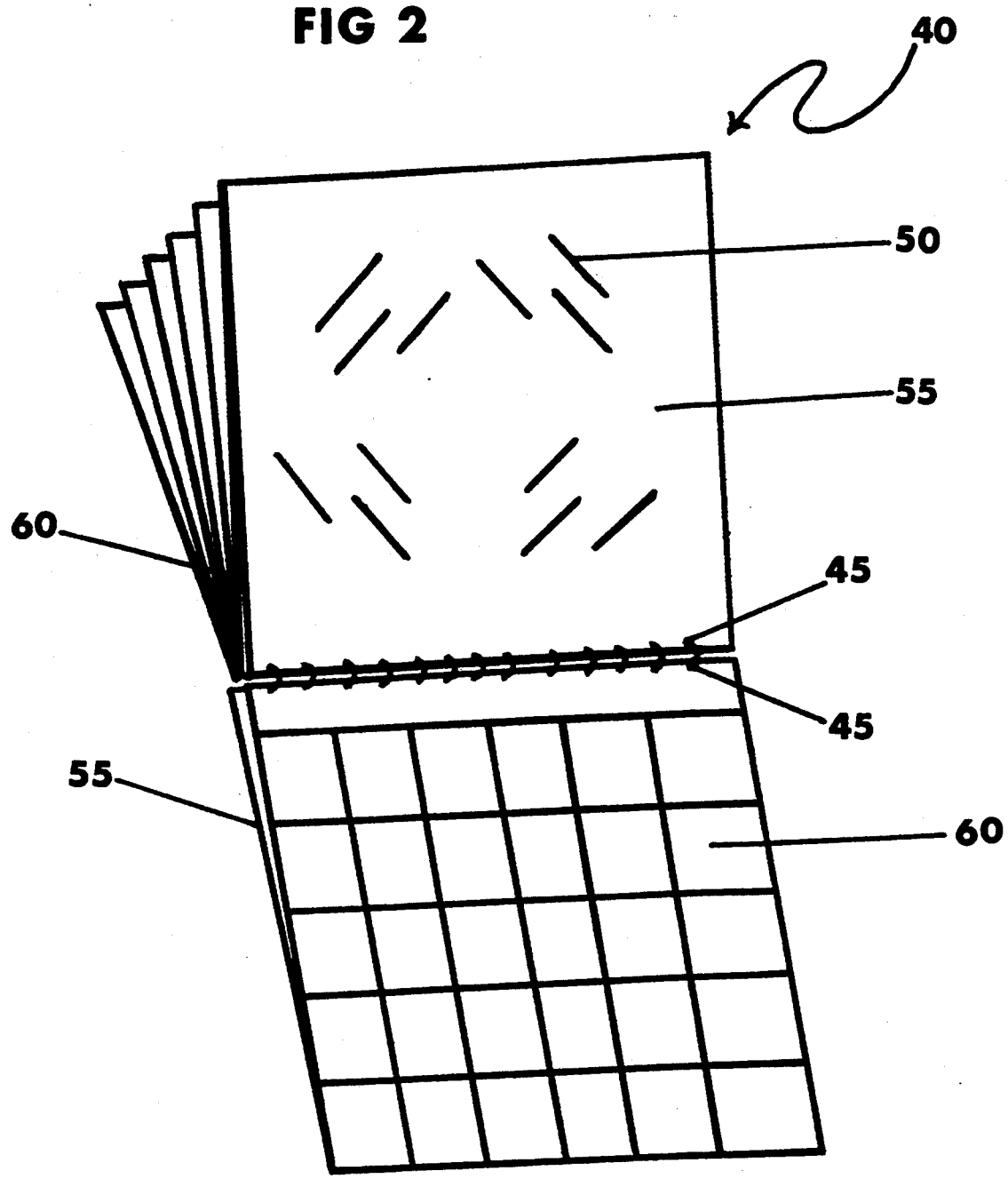

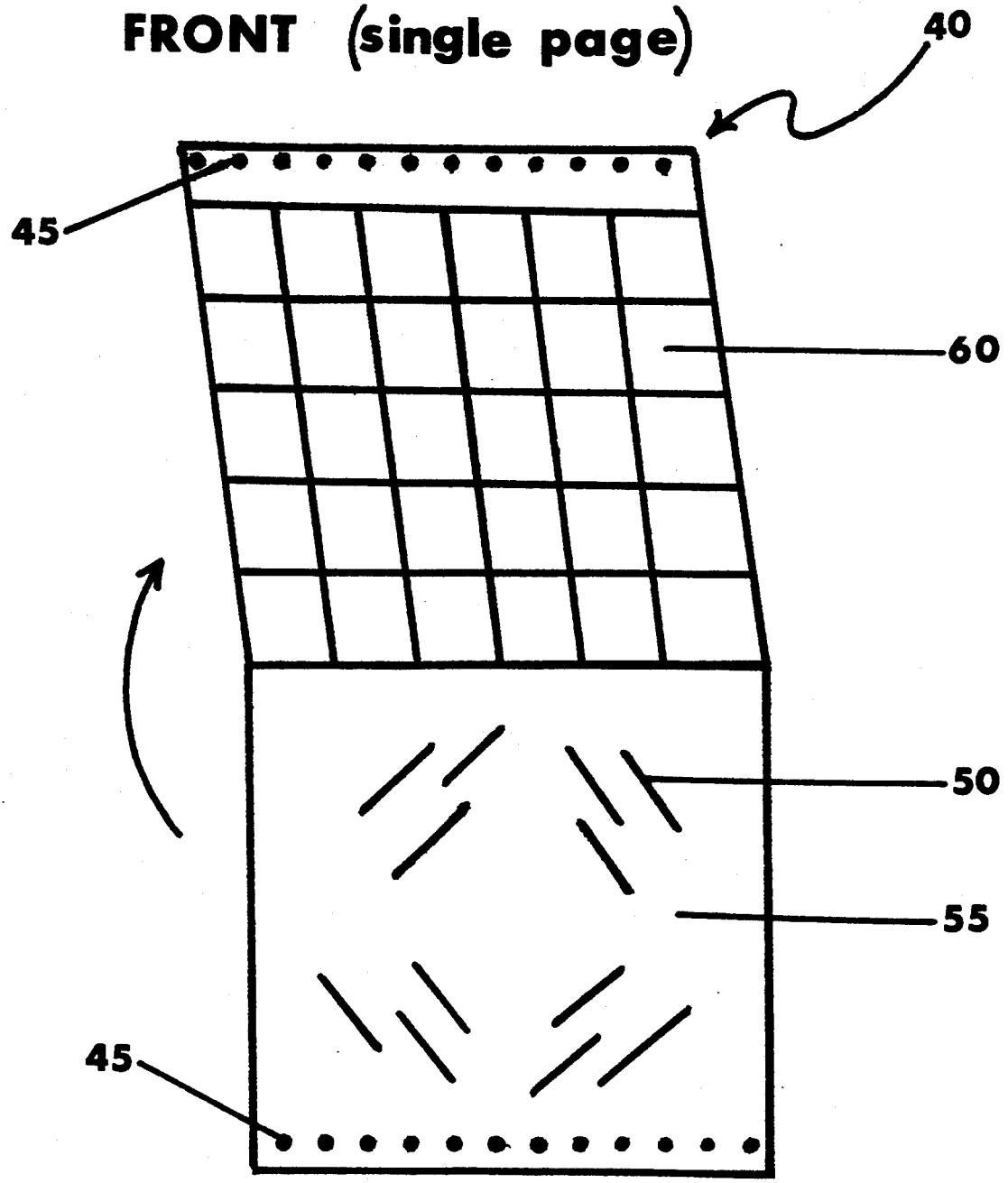

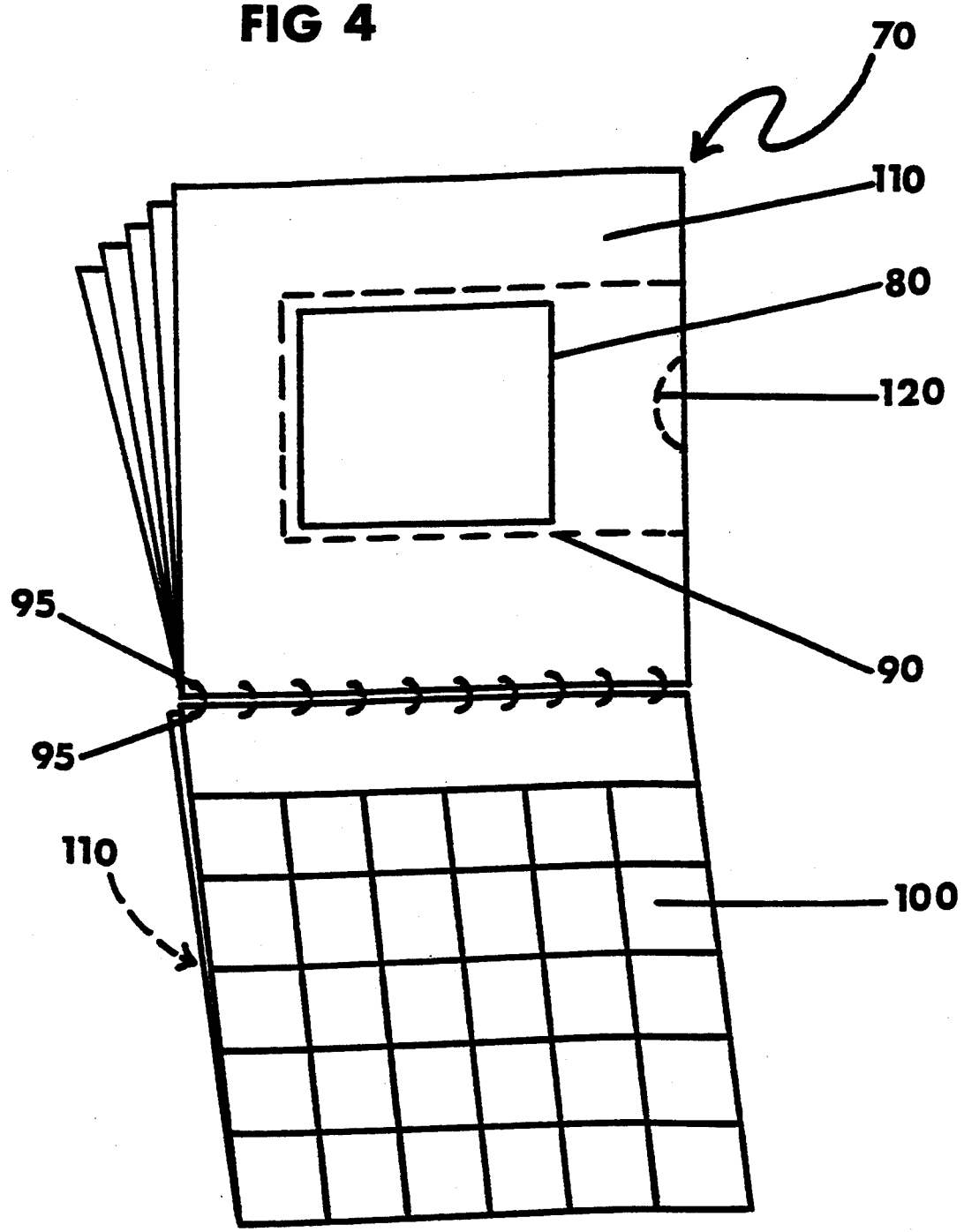

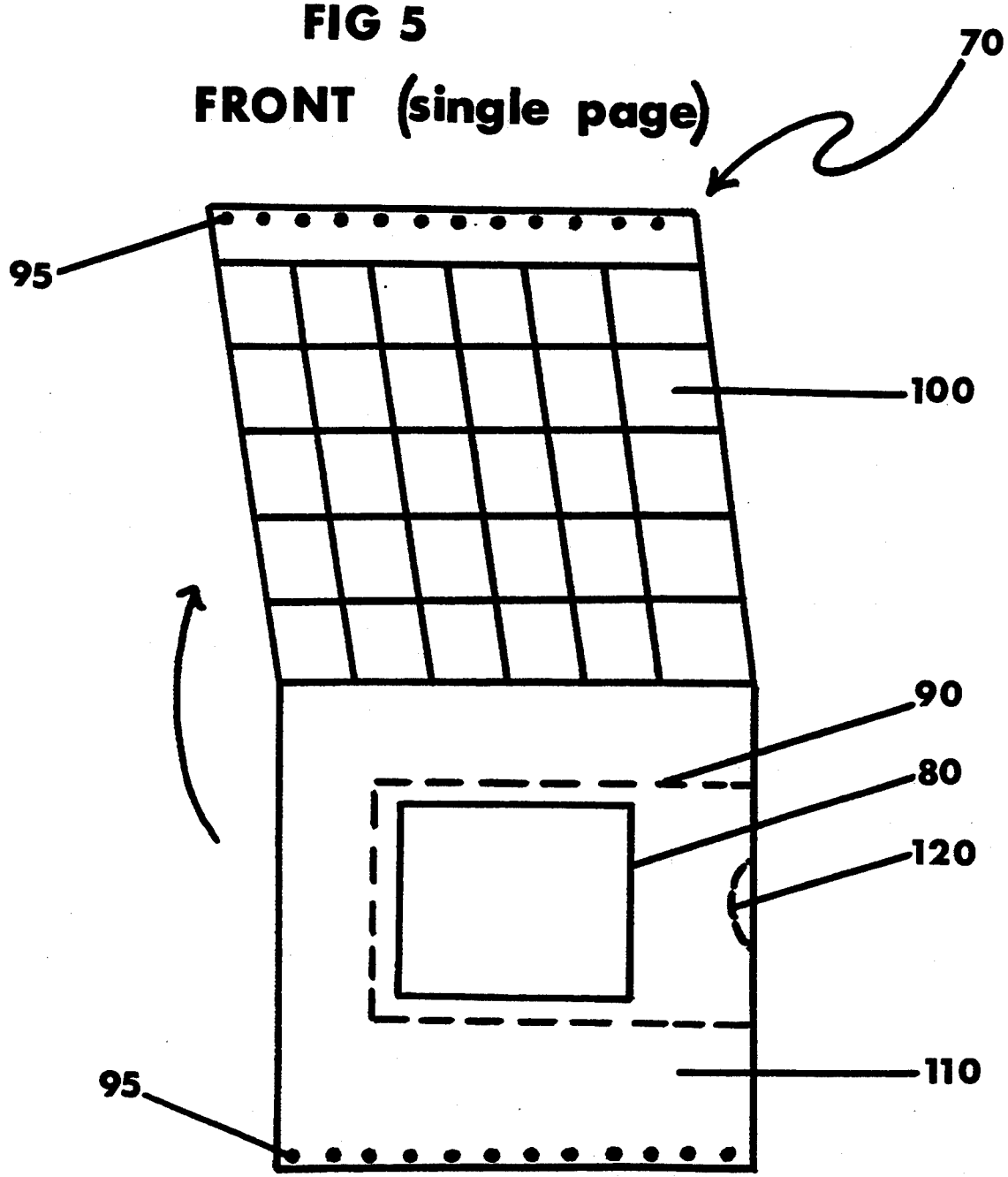

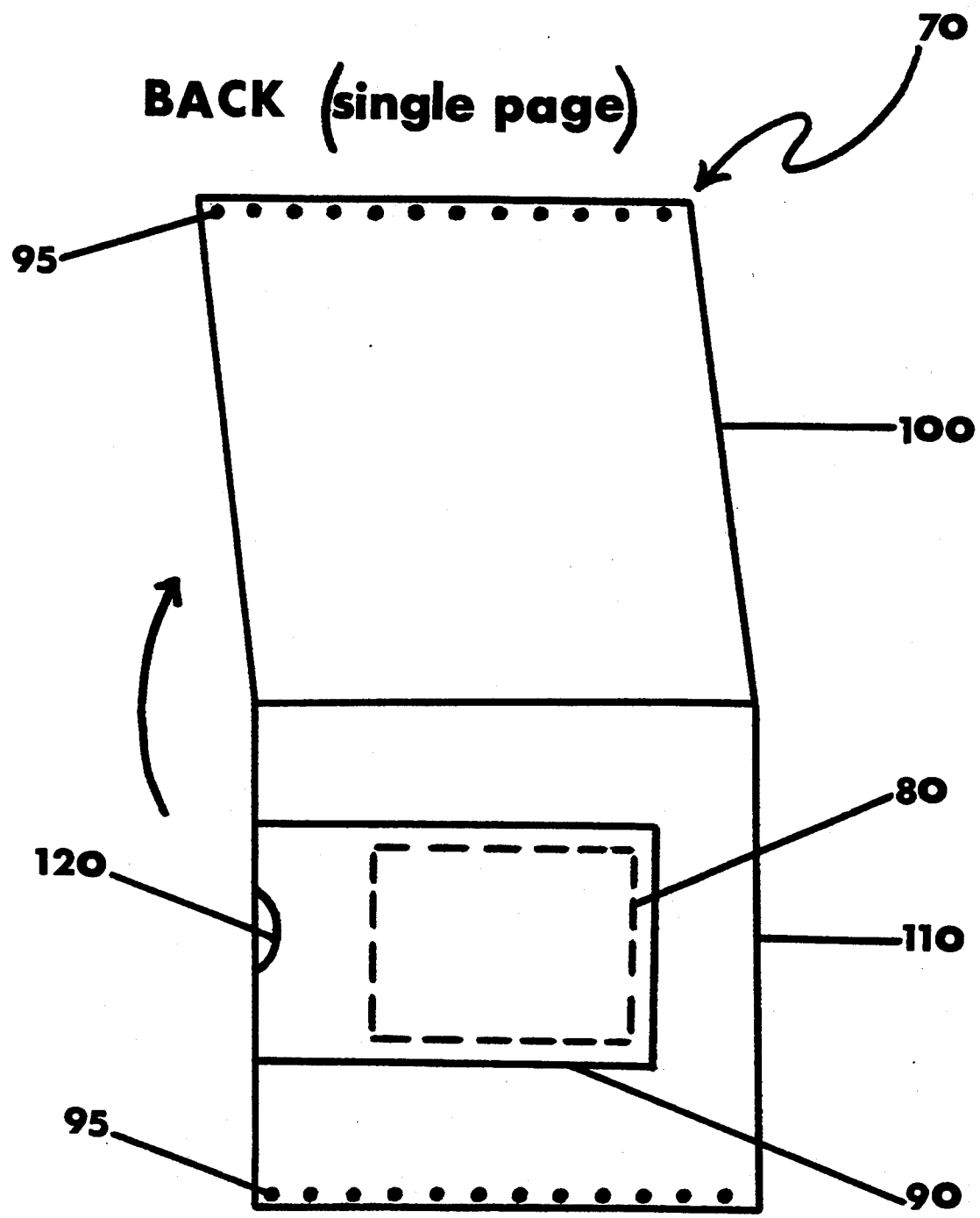

CALENDAR PHOTO ALBUM

BACKGROUND OF THE INVENTION

1. Field of the Invention

This invention relates in general to display type calendars and more specifically, to calendars provided with the means for changing the artistic display of photographs, pictures, and other graphic works.

2. Description of the Prior Art

Pictures are often displayed with calendars to make the calendars more attractive. Sometimes a single picture may be used the entire year with tear-off calendar sheets. Usually calendars display a new picture each month. With such calendars, one, of course, is limited to the particular pictures selected by the manufacturer of the calendar.

To overcome this disadvantage, and to enable one to display the work of their choosing, several inventions have been devised, as typified by U.S. Pat. No. 715,479 issued to F.E. Housh. Housh discloses a frame and calendar with a backing and a mat affixed thereto for displaying a selected picture, advertising devise, or other printed material. Other relevant disclosures are those of Brindly, U.S. Pat. No. 4,276,703; Diambra, U.S. Pat. No. 3,534,489; Jones, U.S. Pat. No. 1,172,606 and Magnus, U.S. Pat. No. 2,010,102.

Common problems of previously existing photo-calendar devices are the lack of ready access for mounting and removal of pictures of varying dimensions and the inability to make monthly changes. Newberry & Newberry, U.S. Pat. No. 5,033,215 disclosed a calendar apparatus displaying a plurality of picture holding members on the front surface of a backing mat which also displayed a means of holding a calendar on said mat. Therefore, interchangeable artistic displays and calendar were mounted on the same backing mat.

Some disadvantages of the above calendar apparatus is that it does not allow for inclusion of more than photograph at any one time into the calendar apparatus, the framework must be removed in order to change the photos, the apparatus does not fold into a manageable size, it is heavy overall due to its thick backing member, and it does not accommodate a front and back display cover.

SUMMARY OF THE INVENTION

The present invention overcomes these and other problems by providing a calendar which discloses picture holding members on every monthly calendar leaf. Each photo or piece of artwork can easily be interchanged at any time without disturbing the framework. It is lightweight, easily hung and displayed, and folds into a manageable size. A front and back cover could display personal or business pictures and/or information. Calendar photo Albums for business use could incorporate business logos into the framework of every calendar page surrounding the artwork. Businesses could display "employees of the month" pictures of the business or facility for marketing purposes, and monthly specials/discounts, etc.. Each business could set up tailored calendars displaying twelve target areas which could all be included and displayed concurrently in the original calendar. Personal use could include sending a personal collection of photos or graphic art to family and friends for special occasions during the year. An important aspect of the Calendar Photo Album is that each collection of photos can be placed in the recipients personal photo albums for everlasting remembrances. A more thorough description may be seen in the appended claims.

It is therefore a primary object of the present invention to provide a calendar with a plurality of reusable picture holding members which hold and are easily interchangeable with a variety of chosen pictures and photos without disturbing the framework.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 2 is a front elevation of embodiment # 2 of the calendar photo album, of the present invention.

FIG. 3 is a front elevation of embodiment # 2 of the calendar photo album of FIG. 2, showing a single unfolded page for clarity.

FIG. 4 is a front elevation of embodiment # 3 of the calendar photo album, of the present invention.

FIG. 5 is a front elevation of embodiment # 3 of the calendar photo album of FIG. 3, showing a single unfolded page for clarity.

FIG. 6 is a back elevation of embodiment # 3 of the calendar photo album of FIG. 3, showing a single unfolded page for clarity.

DETAILED DESCRIPTION OF THE PREFERRED EMBODIMENTS

Figure 1:
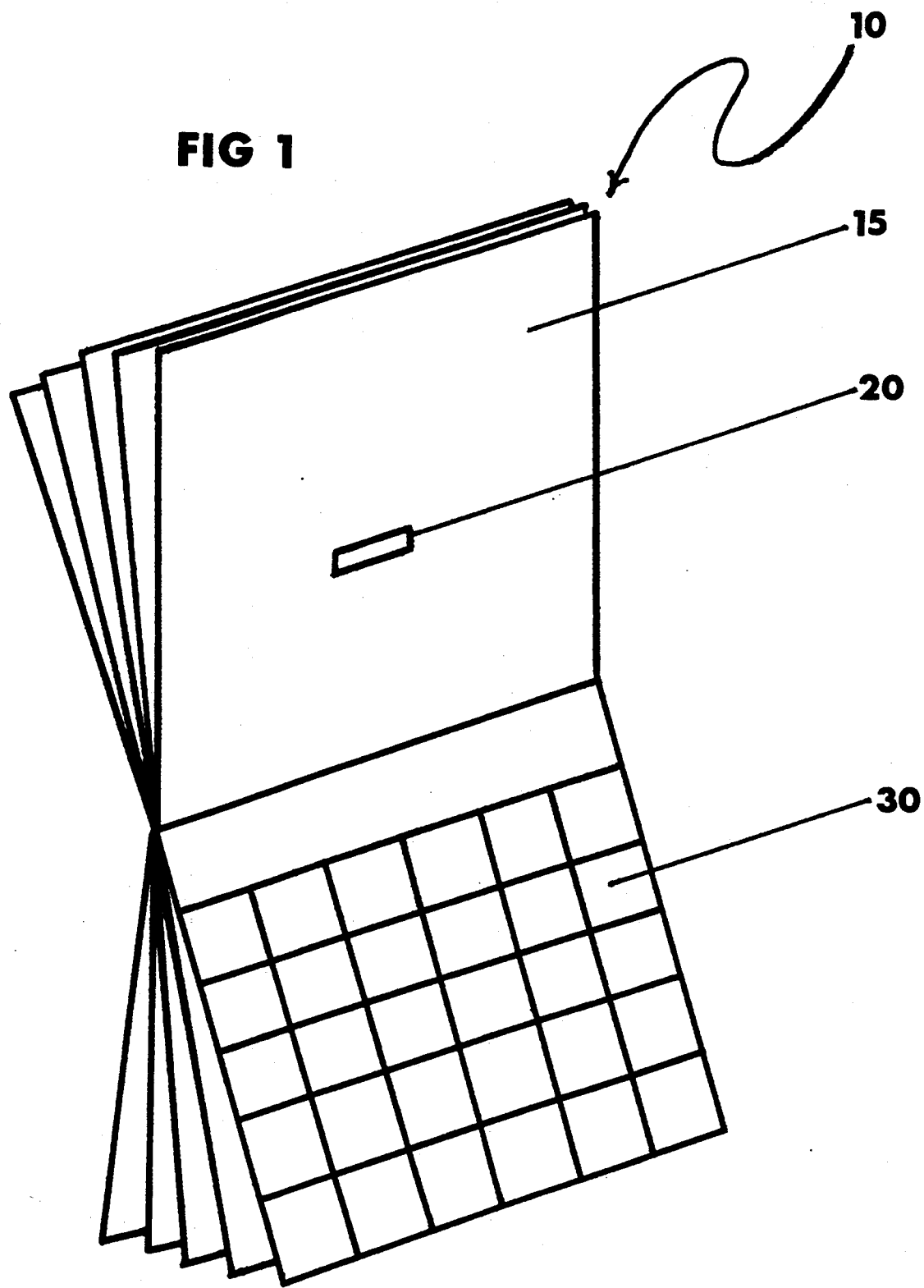
FIG. 1 is a front elevation of embodiment # 1 of the calendar photo album, of the present invention.

Referring now to the drawings, an embodiment to be preferred of embodiment # 1 of the Calendar Photo Album 10, made according to the present invention is disclosed. The Calendar Photo Album 10, as shown in FIG. 1 includes generally, Calendar Pages 30, Photo Display Pages 15, and Picture Holding Members 20.

Calendar Pages 30 and Photo Display Pages 15 are, in the embodiment shown, generally rectangular and substantially square in shape and are constructed of any suitable material, such as, heavy grade paper, plastic coated paper, photography paper, etc..

Picture Holding Members 20 are, in the embodiment shown, defined by an area of adhesive material such as double-sided adhesive tape, tacky adhesive, velcro or similar material and serve as the attachment means for photos or other graphic work. The terms "photo" and "picture" herein and in the appended claims are considered to include the conventional definition as well as photographs, designs, and other graphic material.

Photo display pages 15 each have a Picture Holding Member 20 and are on opposing pages from the Calendar Pages 30.

Calendar pages 30 are, in the embodiment shown, comprised of calendar pages of a different month of the year assembled in chronological order.

Referring now to the drawings, an embodiment to be preferred of embodiment # 2 of the Calendar Photo Album 40, made according to the present invention disclosed. The Calendar Photo Album 40, as shown in FIG. 2 & 3, includes generally, Calendar Pages 60, Photo Display Pages 55, Picture Holding Members 50, and a Means of Attachment of Pages 45.

Calendar Pages 60 and Photo Display Pages 55 are, in the embodiment shown, generally rectangular and substantially square in shape and are constructed of any suitable material such as heavy grade paper, plastic coated paper, photography paper, etc.

Picture Holding Members 50 are, in the embodiment shown, defined by at least two sets of diagonal slits 50, cut into the Photo Display Page 55.

Referring now to FIG. 3 showing a front elevation of an unfolded single page of the Calendar Photo Album 40 for clarity, revealing a Photo Display Page 55 with Picture Holding Members 50 on one half of the Calendar Photo Album 40 page and a Calendar Page 60 on the opposing half. The Calendar Page 60, when folded down becomes the backing member for the Photo Display Page 55.

A Means of Attachment of Pages 45, in the embodiment shown, consists of a row of holes along the top edge of the Calendar Page 60 and the bottom edge of the Photo Display Page 55. Referring now to FIG. 2, showing an assembled Calendar Photo Album 40 displaying a plurality of pages each having a Means of Attachment of Pages 45 one to the other. Obviously, other means of attaching said plurality of pages would suffice.

Referring now to the drawings an embodiment to be preferred of embodiment # 3 of the Calendar Photo Album 70, made according to the present invention disclosed. The Calendar Photo Album 70, as shown in FIGS. # 4, 5 & 6, includes generally, Calendar Pages 100, Photo Display Pages 110, Picture Frame Members 80, Picture Holding Members 90 for holding photos, a Finger Indentation 120 for easily inserting and removing photos, and a Means of Attachment of Pages 95.

Calendar Pages 100 and Photo Display Pages 110 are, in the embodiment shown, generally rectangular and substantially square in shape and are constructed of any suitable material such as heavy paper, plastic coated paper, photography paper, etc.

Picture Frame Members 80 are, in the embodiment shown, defined by a cut-out section in the Photo Display Page 110.

The Picture Holding Members 90 are, in the embodiment shown defined as plastic sleeves which are sealed on three sides. The Picture Holding Members 90 are attached behind the Picture Frame Members 80 on three sides with an adhesive material, forming a window of plastic.

The Finger Indentations 120 are, in the embodiment shown, defined as cut-out portions on the back edge of the Picture Holding Members 90, located along the open end of the plastic sleeve and parallel to the vertical edge of the Photo Display Page 110, designed to facilitate insertion and removal of photos into Picture Holding Members 90.

Referring now to FIG. 5 showing a front elevation of an unfolded single page of the Calendar Photo Album 70, for clarity, revealing Photo Display Page 110 with Picture Frame Member 80, Picture Holding Member 90 and Finger Indentation 120 on one half of the Calendar Photo Album 70 page and a Calendar Page 100 on the opposing half. The Calendar Page 100, when folded down becomes the backing member for the Photo Display Page 110.

Referring now to FIG. 6 showing a back elevation of an unfolded single page of the Calendar Photo Album 70, for clarity, revealing a Photo Display Page 110 with a Picture Frame Member 80, Picture Holding Member 90 , and a Finger Indentation 120 on one half of the Calendar Photo Album 70 and a Calendar Page 100 on the opposing page.

Referring now to FIG. 4, showing an assembled Calendar Photo Album 70, displaying a plurality of pages each having a Means of Attachment of Pages 95 one to the other.

Having thus described in detail the three preferred embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

We claim:

1. A calendar photo album for displaying calendar information in combination with graphic material in a predetermined arrangement, the graphic material being changeable without disturbing the calendar information or the predetermined arrangement, said calendar photo album comprising: calendar pages; photo display pages; graphic material holding means; and a means of attachment of pages,
    said calendar pages being generally rectangular and substantially square in shape comprising a front side and a back side and a periphery defined by four edges;
    said photo display pages being generally rectangular and substantially square in shape comprising a front side operable for presenting the graphical material, a back side, and a periphery defined by four edges;
    said graphic material holding means being two sets of diagonally spaced slits in the photo display pages, each set of slits consisting of two slits parallel to each other and arranged in a direction substantially diagonal with respect to edges of the photo display pages, each set being orthogonal with respect to the other set; and
    said means of attachment of pages being a means which attaches one calendar page to one photo display page forming a page pair comprising two sides, a photo display page side and a calendar page side with a void therebetween, the boundary of the void being defined by the back side of the calendar page and the back side of the photo display page, whereby the graphic material having its corners inserted into the slits of said graphic material holding means is held on the front side of the photo display page with the corners of the graphic between the pages of the page pair, the corners further being within the void and in contact with the back side of the calendar page and the back side of the photo display page so that the graphic is visible from the photo display page side of the page pair and the calendar information is visible from calendar page side of the page pair and the corners of the graphic being hidden from view, the means of attachment of pages further being operable to attach a plurality of page pairs to form a booklet of page pairs bound at a common edge.

2. A calendar photo album of claim 1,
    said calendar page and said photo display page being a single rectangular sheet of material having been folded in half to form a substantially square shape having four sides: front and back photo display page sides, and front and back calendar page sides where one edge of each of the pages comprises the fold, the front of the calendar page having the calendar information and the front of the photo display page having an area to receive the graphic material holding means.

3. A calendar photo album for displaying calendar information in combination with graphic material in a predetermined arrangement, the graphic material being changeable without disturbing the calendar information or the predetermined arrangement, the calendar photo album comprising: calendar pages; photo display pages; graphic material holding means; and a means of attachment of pages, said calendar pages being generally rectangular and substantially square in shape comprising a front side and a back side and a periphery defined by four edges, the front side being operable for carrying the calendar information;

said photo display pages being generally rectangular and substantially square in shape comprising a front side with a rectangular cutout operable for presenting the graphic material, a back side, and a periphery defined by four edges;

said graphic material holding means being a plastic sleeve sealed on three sides slightly larger in size than the cutout in the photo display pages and being operable for receiving the graphic material therebetween and having a finger indentation on one side for facilitating insertion and removal of graphic material;

said means of attachment of pages being a means which attaches one calendar page to one photo display page forming a page pair having two sides, a photo display page side and a calendar page side with a void therebetween, the boundary of the void being defined by the back side of the calendar page and the back side of the photo display page, whereby the graphic material having been inserted into the sleeve of said graphic material holding means is held between the pages of the page pair, the sleeve further being within the void and in contact with the back side of the calendar page and the back side of the photo display page so that the graphic is visible from the photo display page side of the page pair through the cutout therein and the calendar information is visible from calendar page side of the page pair and the edges of the sleeve being hidden from view, the means of attachment of pages further being operable for attaching a plurality of page pairs to form a booklet of page pairs bound at a common edge.

4. A calendar photo album of claim 3, said calendar page and said photo display page being a single rectangular sheet of material that is folded in two to form a substantially square shape having four sides: front and back photo display page sides, and front and back calendar page sides where one edge of each of the pages comprises the fold, the front of the calendar page having the calendar information and the front of the photo display page having an area to receive graphic material bounded by the sleeve.

* * * * *